United States Patent
Chen

(10) Patent No.: US 12,032,665 B2
(45) Date of Patent: Jul. 9, 2024

(54) SYSTEM AND METHOD FOR ENHANCING IT SYSTEM ACCESS SECURITY WITH SMART CLOUD SERVICE

(71) Applicant: Shuang Chen, Somers, NY (US)

(72) Inventor: Shuang Chen, Somers, NY (US)

(*) Notice: Subject to any disclaimer, the term of this patent is extended or adjusted under 35 U.S.C. 154(b) by 642 days.

(21) Appl. No.: 17/091,804

(22) Filed: Nov. 6, 2020

(65) Prior Publication Data
US 2021/0133301 A1    May 6, 2021

Related U.S. Application Data

(60) Provisional application No. 62/931,337, filed on Nov. 6, 2019.

(51) Int. Cl.
*G06F 21/31* (2013.01)
*H04L 9/40* (2022.01)

(52) U.S. Cl.
CPC ............ *G06F 21/316* (2013.01); *H04L 63/08* (2013.01)

(58) Field of Classification Search
CPC ............................. G06F 21/316; H04L 63/08
USPC .................................................. 726/7
See application file for complete search history.

(56) References Cited

U.S. PATENT DOCUMENTS

| | | | |
|---|---|---|---|
| 10,915,613 B2* | 2/2021 | Himabindu | H04L 9/3231 |
| 11,184,766 B1* | 11/2021 | Lord | G06V 10/75 |
| 11,822,662 B2* | 11/2023 | Shear | G06F 21/6245 |

OTHER PUBLICATIONS

Sittampalam et al., 2019 IEEE, Region 10 Conference, "SAMS: An IoT Solution for Attendance Management in Universities", pp. 251-256 (Year: 2019).*

* cited by examiner

*Primary Examiner* — Khalil Naghdali
(74) *Attorney, Agent, or Firm* — Benjamin Aaron Adler

(57) ABSTRACT

Provided herein are smart cloud service systems to enhance information technology system access security and computer-implemented and user-implemented methods of use. The smart cloud service is in electronic communication with a system access point on a system access management (SAM) server which is configured to establish a distributed system access point on a system access management (SAM) client. The smart cloud service distributes, deploys, updates and synchronizes modules or components on the SAM server and the SAM client to enable authentication questions and answers to be generated by a multi-factor authentication engine from data acquired from a user's personal online use and behavior history when access to a protected IT system is requested.

18 Claims, 5 Drawing Sheets

SYSTEM AND METHOD FOR ENHANCING IT SYSTEM ACCESS SECURITY WITH SMART CLOUD SERVICE

CROSS-REFERENCE TO RELATED APPLICATIONS

This non-provisional application claims benefit of priority under 35 U.S.C. § 119(e) of provisional application U.S. Ser. No. 62/931,337, filed Nov. 6, 2019, the entirety of which is hereby incorporated by reference.

BACKGROUND OF THE INVENTION

Field of the Invention

The present invention relates to the fields of Internet security and smart cloud services. Specifically, the present invention relates to systems and method for enhancing information technology (IT) systems access security over the Internet.

Description of the Related Art

It is well known that the static log in (user name+ password) is very vulnerable to security breaches as the user name and password can be stolen, lost or hacked relatively easily. Current best practices in the global market are to add additional verification means to authenticate the user, for example, two-factor authentication (2FA) or multi-factor authentication (MFA). It is also well known that two-factor authentication is generally better given all the trade-offs. The industrial best practice of two-factor authentication includes using a dedicated device to generate an access code, sending the verification code to the user's mobile phone or email or answering a set of previously stored security questions. The user is required to enter this verification code or to correctly answer the security questions in addition to the user's name and password to access the system.

But the current 2FA (or MFA) approach still has a risk of failure, such as, a lost or stolen access code device or a text or email containing the verification code intercepted by malware, or simply forgetting the pre-set answers to the security questions. In the case of forgotten answers to security questions, the system may fall back to sending the verification code via text or email messages or the user talking to a live systems support person over the phone, if feasible.

Specifically, for major access, security risks are unauthorized accesses into the protected information technology system (PITS) and unauthorized access into the protected digital assets (PDA), i.e. data, files or subsystems of the PITS. The unauthorized access into the protected IT system and/or the protected digital assets results primarily from compromised credentials via stolen ID/password/verification codes through physical stealing, online hacking, embedded malware, etc.

Thus, there is a need in the art for a theft-proof approach to secure online access that is used either on top of or in replacement of the existing best practice to any IT systems. Specifically, a smart-cloud supported system access management function is utilized to eliminate these security risks. The present invention fulfills this longstanding need and desire in the art.

SUMMARY OF THE INVENTION

The present invention is directed to a smart-cloud service system for enhanced information technology system access security having at least one processor, at least one memory in communication with the processor and at least one network connection to a smart device. The memory tangibly stores instructions that, when executed by the processor are configured to receive as input from a smart device a user request for access to a protected IT system and to distribute from the smart-cloud parts of a system access point application and middleware environment required for log-in to a system access management (SAM) server and a SAM-client. The executable instructions are configured to extract personal system user behavior data from a user entity behavior analytics database into a personal system UEB database and into a personal system access management (SAM) database on the SAM-server and to extract personal terminal UEB data from user access to the smart device and to the smart-cloud services system into the personal system UEB database and into the personal SAM database on the SAM-client. The executable instructions are configured to generate authentication questions and answers for multi-factor authentication based on data in the personal SAM database on the SAM-client.

The present invention is directed to a related smart-cloud service system comprising further processor executable instructions to synchronize the personal SAM databases on the SAM server and the SAM client when an incremental change is detected therein. The present invention is directed to another related smart-cloud service system comprising further processor executable instructions to support an initial distribution, deployment and update of a SAM client engine on the SAM-client of a personal terminal UEB on the SAM-client and of the personal SAM data on the SAM-client.

The present invention also is directed to a smart cloud service system. The smart cloud service system comprises, in electronic communication therewith, a system access management (SAM) server that comprises a system access point (SAP), a SAM server engine and a first plurality of data modules, said SAM server engine in communication with the system access point and the plurality of data modules and a user entity behavior analytics (UEBA) module in communication with one of the plurality of data modules SAM server. The smart cloud service system is in electronic communication with a system access management (SAM) client comprising a distributed system access point (DSAP), a SAM client engine and a second plurality of data modules, said SAM server engine in communication with the system access point and the plurality of data modules.

The present invention is directed further to a computer-implemented method for enhancing security during online access of a private IT system. In the computer-implemented method an input is received in the smart cloud service system described herein from a user's smart device requesting access to the private IT system and components of the system access point required for log-in to the SAM-server to establish the distributed system access point (DSAP) on the SAM client server are distributed therefrom. Data is acquired about the user's previous online use and behavior at least one authentication question for the user based on the acquired data is generated on the SAM client server via a multi-factor authentication engine. The user's answers to the at least one authentication question are received as input and access to the protected IT system via the system access point is granted as output if the user's answers agree with the answers generated from data acquired about the user's previous online use and behavior.

The present invention is directed to a related computer-implemented method further comprising generating at least one additional authentication question and answer if authentication partially or completely fails. The present invention is directed to another related computer-implemented method where the distributing step further comprises distributing application and data components to the SAM-server to establish a DSAP+App+Data access point on the SAM client server.

The present invention is directed further still to a user-implemented method for securely accessing a protected IT system (PITS) online. In the user-implemented method a user inputs a request on a smart device for access to the protected IT system and receives at least one intelligent authentication question from a multi-factor authentication engine based on the user's previous online use and behavior acquired therewith. The user inputs answers on the smart device to the at least one intelligent authentication questions and receives one or more pages from the protected IT system as a display on the smart device if authentication is granted. The present invention is directed to a related user-implemented method further comprising the user receiving at least one additional intelligent authentication question after the user inputs the answers.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions and certain embodiments of the invention briefly summarized above are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
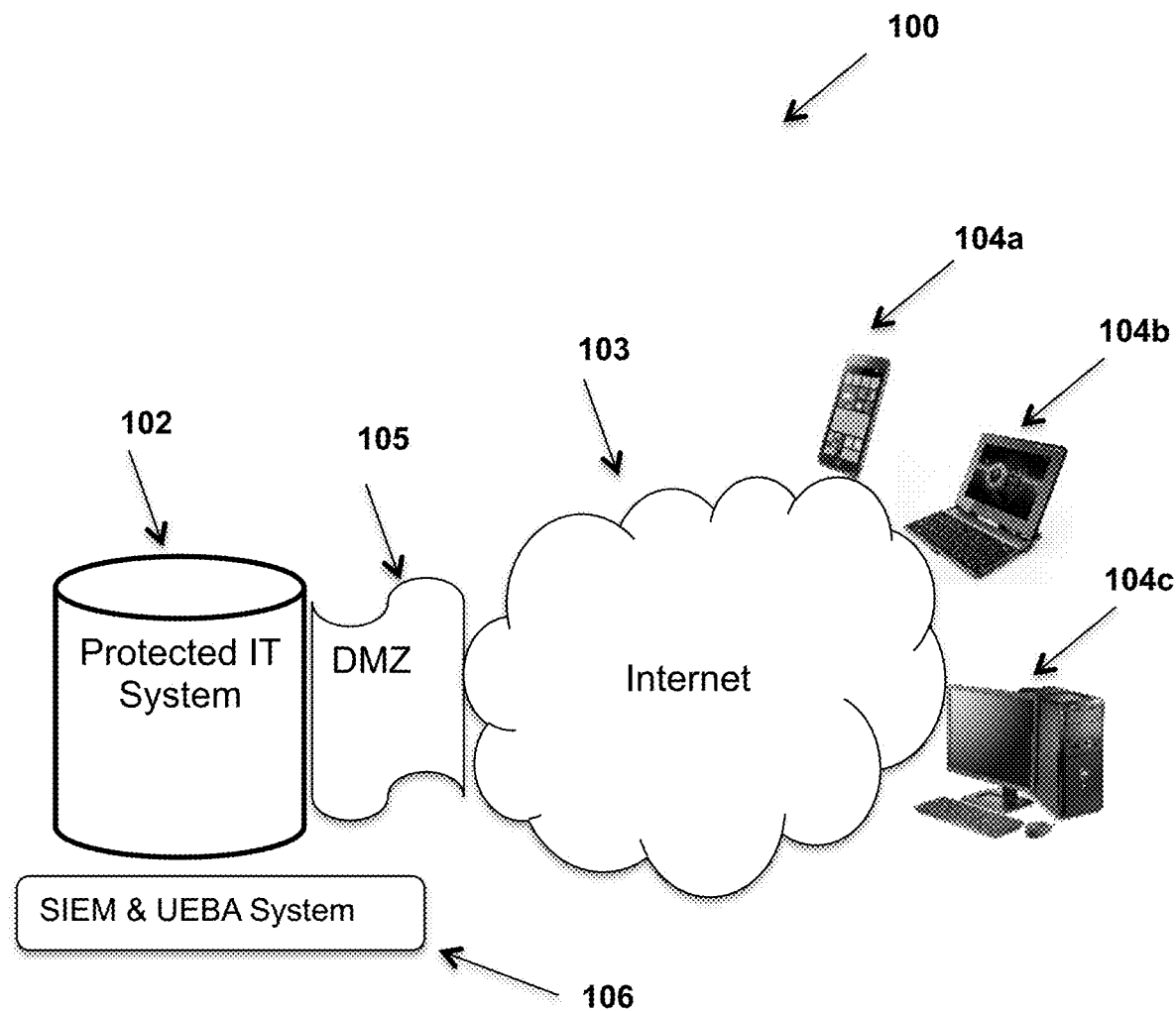
FIG. 1 illustrates typical online access to a Protected IT System via the Internet.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "smart device" refers to an electronic device that generally includes a processor, a memory, at least one input apparatus, such as, a keyboard, a mouse, a point and touch device, a touch screen, or a microphone, a display structure, for example, a screen, and means to display content. The smart device may include at least one information storage/retrieval apparatus and/or means to store/retrieve information, such as, for example, a hard drive, a disk drive or a flash drive or memory stick, or other non-transitory computer readable media or non-transitory storage device, as is known in the art. Additionally, the smart device may include one or more network connections, such as wired or wireless connections. The smart device may include more or less than what is listed above. A smart device may be, but not limited to, a smart phone, a tablet computer, a laptop computer, a desktop computer and encompasses other electronic media or electronic devices, as is known in the art, for example, but not limited to tablet computers or smart devices.

As used herein, the term "Distributed Internet Services system" or "DIS system" refers to a distributed Internet service platform that transforms Internet applications to perform in various computing environments. A DIS system distributes Internet applications, including content, data and logic, to whatever extent appropriate and to any number and any kind of device across the network, via a Component Distribution Server/Asset Distribution Server. Through DIS, Internet applications can be hosted and managed centrally, with services based on each user's need, and cached and executed locally at the user device or nearby locations while maintaining its integrity. Any web-enabled computing device can be upgraded with the DIS software to become DIS-enabled to enjoy and perform distributed Internet services. The Distributed Internet Services system is completely described in any one of a family of patents of U.S. Pat. Nos. 7,136,857, 7,150,015, 7,181,731, 7,209,921, 7,430,610, 7,685,183, 7,685,577, 7,752,214, 8,326,883, 8,386,525, 8,443,035, 8,458,142, 8,458,222, 8,473,468, 8,527,545, 8,650,226, 8,666,933 and 8,713,062, all of which are commonly owned by OP40, Holdings, Inc., as is the instant application, and all of which are hereby incorporated by reference.

As used herein, "smart cloud service system" or "smart cloud service" refers to cloud computing that utilizes the Distributed Internet Services system as described supra.

As used herein, the acronym UEB refers to User Entity Behavior. The acronym UBA refers to USER Behavior Analytics. The acronym UEBA refers to User Entity Behavior Analytics. The acronym SIEM refers to Security Information and Event Management. The acronym 2FA refers to Two-factor Authentication. The acronym MFA refers to Multi-factor Authentication. The acronym PITS refers to Protected IT System. The acronym PDA refers to Protected Digital Assets. The acronym PTUEB refers to Personal Terminal User Entity Behavior. The acronym SAP refers to System Access Point. The acronym DSAP refers to Distributed System Access Point. The acronym SAM refers to System Access Management. The acronym PSAM refers to Personal System Access Management.

In one embodiment of the present invention there is provided a smart-cloud service system for enhanced information technology system access security having at least one processor, at least one memory in communication with the processor and at least one network connection to a smart device, said memory tangibly storing instructions that, when executed by the processor are configured to receive as input from a smart device a user request for access to a protected IT system; distribute from the smart-cloud parts of a system access point application and middleware environment required for log-in to a system access management (SAM) server and a SAM-client; extract personal system user behavior data from a user entity behavior analytics database into a personal system UEB database and into a personal system access management (SAM) database on the SAM-server; extract personal terminal UEB data from user access to the smart device and to the smart-cloud services system into the personal system UEB database and into the personal SAM database on the SAM-client; and generate authentication questions and answers for multi-factor authentication based on data in the personal SAM database on the SAM-client.

Further to this embodiment the smart cloud service system comprises processor executable instructions to synchronize the personal SAM databases on the SAM-server and the SAM-client when an incremental change is detected therein. In another further embodiment, the smart cloud service system comprises processor executable instructions to support an initial distribution, deployment and update of a SAM client engine on the SAM-client; support an initial distribution, deployment and update of a personal terminal UEB on the SAM-client; and support an initial distribution, deployment and update of the personal SAM data on the SAM-client.

In one aspect of all embodiments the processor executable instructions may be configured to distribute the parts of the system access point application and the middleware environment to the system access management (SAM) server to establish a distributed system access point (DSAP) on the SAM-client. In another aspect of all embodiments the system access point (SAP) is a SAP+APP+Data access point, the processor executable instructions are configured to distribute the parts of the a SAP+App+Data access point application and the middleware environment to the system access management (SAM) server to establish a distributed SAP+App+Data on the SAM-client.

In another embodiment of the present invention there is provided a smart cloud service system, comprising, in electronic communication therewith, a system access management (SAM) server comprising a system access point (SAP), a SAM server engine and a first plurality of data modules, where the SAM server engine is in communication with the system access point and the plurality of data modules; a user entity behavior analytics (UEBA) module in communication with one of the plurality of data modules SAM server; a system access management (SAM) client comprising a distributed system access point (DSAP), a SAM client engine and a second plurality of data modules, where the SAM server client engine is in communication with the distributed system access point and the second plurality of data modules.

In this embodiment the system access point may be a SAP+App+Data access point and the distributed system access point is a DSAP+App+Data access point. Also the first plurality of data modules may comprise a personal system UEB data module and a first personal SAM data module, where the personal system UEB data module is configured to receive data from the UEBA module. In addition the second plurality of data modules may comprise a personal terminal UEB data module and a second personal SAM data module, where the personal terminal UEB data module is configured to receive user behavior analytics data.

Also in this embodiment the SAM server engine may comprise a SAM server controller that functions to control personal system UEB data management; a multi-factor authentication engine; personal SAM data management; and risk management and process. In addition the SAM client engine may comprise a SAM server controller that functions to control personal terminal user entity behavior (PTUEB) data management; the multi-factor authentication engine; personal SAM data management; and risk management. Furthermore the distributed system access point on the SAM client is configured to physically isolate a user access from the protected IT system.

In yet another embodiment of the present invention there is provided a computer-implemented method for enhancing security during online access of a private IT system; comprising receiving an input in the smart cloud service system as described supra from a user's smart device requesting access to the private IT system; distributing from the smart cloud service system components of the system access point required for log-in to the SAM-server to establish the distributed system access point (DSAP) on the SAM client server; acquiring data about the user's previous online use and behavior; generating on the SAM client server at least one authentication question for the user based on the acquired data via a multi-factor authentication engine; receiving the user's answers to the at least one authentication question; and granting access to the protected IT system via the system access point if the user's answers agree with the data acquired about the user's previous online use and behavior.

Further to this embodiment the computer-implemented method comprises generating at least one additional authentication question and answer if authentication partially or completely fails. In another further embodiment the distributing step comprises distributing application and data components to the SAM-server to establish a DSAP+App+Data access point on the SAM client server.

In one aspect of all embodiments the step of acquiring data may comprises extracting via the SAM server engine personal UEB data from a user behavior analytics (UEBA) database into a personal system UEB database and into a personal SAM database both on the SAM server; and extracting via the SAM client engine personal terminal UEB data from the user's previous access to the smart device and the smart cloud service system into the personal terminal UEB database both on the SAM client. Further to this aspect the computer-implemented method may comprise synchronizing the personal SAM databases in the SAM server and in the SAM client when an incremental change occurs.

In yet another embodiment of the present invention there is provided a user-implemented method for securely accessing a protected IT system (PITS) online, comprising user-inputting a request on a smart device for access to the protected IT system; user-receiving at least one intelligent authentication question from a multi-factor authentication engine based on user's previous online use and behavior acquired therewith; user-inputting answers to the at least one intelligent authentication questions; receiving one or more pages from the protected IT system as a display on the smart device if authentication is granted. Further to this embodiment the user-implemented method comprises receiving at least one additional intelligent authentication question after the step of user-inputting the answers.

In both embodiments the at least one intelligent authentication question may be based on the user's personal system access management data acquired from a user behavior analytics (UEBA) database or personal terminal use data acquired from a personal terminal UEB database or a combination thereof.

Provided herein are system and method for a theft-proof solution to solve the online access security problem for any protected IT system. The system and method invention utilizes the distributed system access point software supported by the distributed internet service (DIS) technology or smart-cloud services and the enhanced user entity behavior analytics (UEBA)-based multi-factor authentication (MFA) at the distributed system access point, thus greatly reducing the risk of unauthorized system access and enhances the security of online system access.

Particularly, the system utilizes a smart-cloud supported system access management (SAM) function to effectively eliminate security risks, thereby greatly enhancing the system access security. Moreover, the system can combine with the well-known system security solutions from SIEM (Security Information and Event Management) and UEBA (User Entity Behavior Analytics to provide an even higher level of system alert and access protection.

The system and method provided herein does not require the user to carry a separate device for secured system access nor is there a need for the system to send the interceptable verification code. Since the MFA questions are generated dynamically in real-time based on the specific user's past system access behavior, this online access security solution contains nothing that can be stolen.

Generally, the system and method are useful in the following instances:

SAP-Only, Authentication

The authorized user accesses PITS using SAM client at SAP, SAM client uses MFA engine with latest PSAM data to generate one or more intelligent authentication questions, such as "When was the last time you accessed the system? a) about one hour ago, b) yesterday, c) last month" or "What system applications did you use when you last time accessed the system? a) Human Resource, b) sales pipeline manager, c) none", etc. Depending on the answers, authentication is granted or rejected, or more questions are asked, if necessary, for example, if authentication partially or completely fails. If successfully authenticated, the SAP page(s) will be displayed by the Web Proxy Manager.

SAP+APP+DATA, Authentication

Authentication and SAP access are as for SAP-only. If successful, the user continues to APP+Data. App+Data runs actually within the SAM Client Engine so no direct access to the PITS.

PITS does not have UEBA Data

Authentication is based solely on PT-UEB data. The rest of the process is the same as for SAP-only or for SAP+APP+DATA.

The system and method provided herein enable supporting edge computing and decentralized application. The smart-cloud-supported system access management (SAM) system provides the unique security protection that is missing in industrial solutions in the global market today. Particularly, the system and method utilize a distributed system access point to physically isolate the user access from the protected IT system. User and entity behavior is collected, for example, the device and the network connection used and/or (UEB) data for each user at the distributed system access point (DSAP). The system and method comprise extra multi-factor authentication (MFA) based on the intelligence from the personal UEB data at the DSAP. Moreover, enhanced MFA is based on the combination of system UEB and DSAP-UEB data. The system and method eliminates the need for the user to rely on a hardware device and/or a mobile phone for obtaining an additional identification code for 2FA or MFA.

Embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 shows a general structure 100 for online access of a protected IT system (PITS) via Internet as used today where a user utilizes one or more online access devices to log in to the system after an authentication process. A user accesses a protected IT system 102 via the Internet 103 with typical online access devices such as a smartphone 104a, a laptop computer 104b or a desktop computer 104c used at the home, the office, the car or any place with access to the Internet. Access to the PITS is secured by a demilitarized zone (DMZ) 105 network. Optionally, additional security may be provided by SIEM and/or UEBA 106 solutions.

Figure 2:
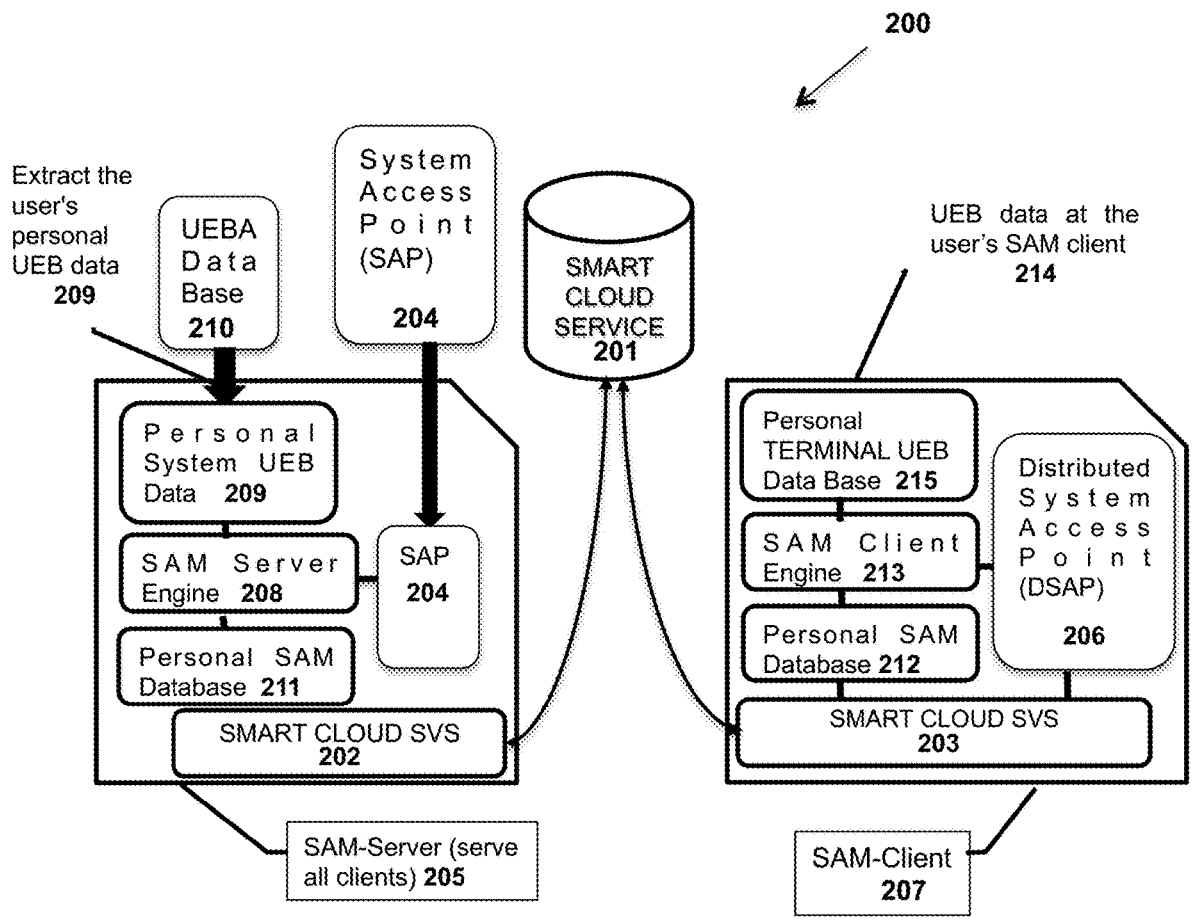
FIG. 2 illustrates the System Access Management (SAM) with smart cloud service with System Access Point (SAP) only.

FIG. 2 shows how to utilize only the System Access Point (SAP) component of the smart-cloud service 200 for secured system access management to enhance security. The smart cloud service 201, 202, 203 distributes the part of the system access point (SAP) application, such as the set of web pages for system log-in, along with the required middleware environment, such as web server, application server and DBMS server, from the SAP 204 on the system access management (SAM) server 205 to establish a distributed system access point (DSAP) 206 on the SAM client 207. The SAM server engine 208 is configured to periodically extract the personal system user behavior (UEB) data 209 from the UEB analytics (UEBA) database 210 into the personal system UEB database 211 on the SAM server and also into the personal SAM database 212 on the SAM client. Meanwhile the SAM client engine 213 is configured to acquire or extract personal terminal UEB data 214 from the user's access to the device and the system into the personal terminal UEB database 215 with the similar parameters and format as UEBA 210 and is configured to merge the acquired data into the personal SAM database 212. The smart cloud service 201, 202, 203 synchronizes among the Personal SAM databases 211, 212 whenever there is an incremental change. The smart cloud service also is responsible for supporting the initial distribution, deployment and update of the SAM client engine, the personal terminal UEB database and the personal SAM database thereon. When the user requests access to the protected IT system, the SAM client engine directs the request to the DSAP and manages the MFA authentication using questions generated from the personal SAM database 212 (see FIGS. 4-5).

Figure 3:
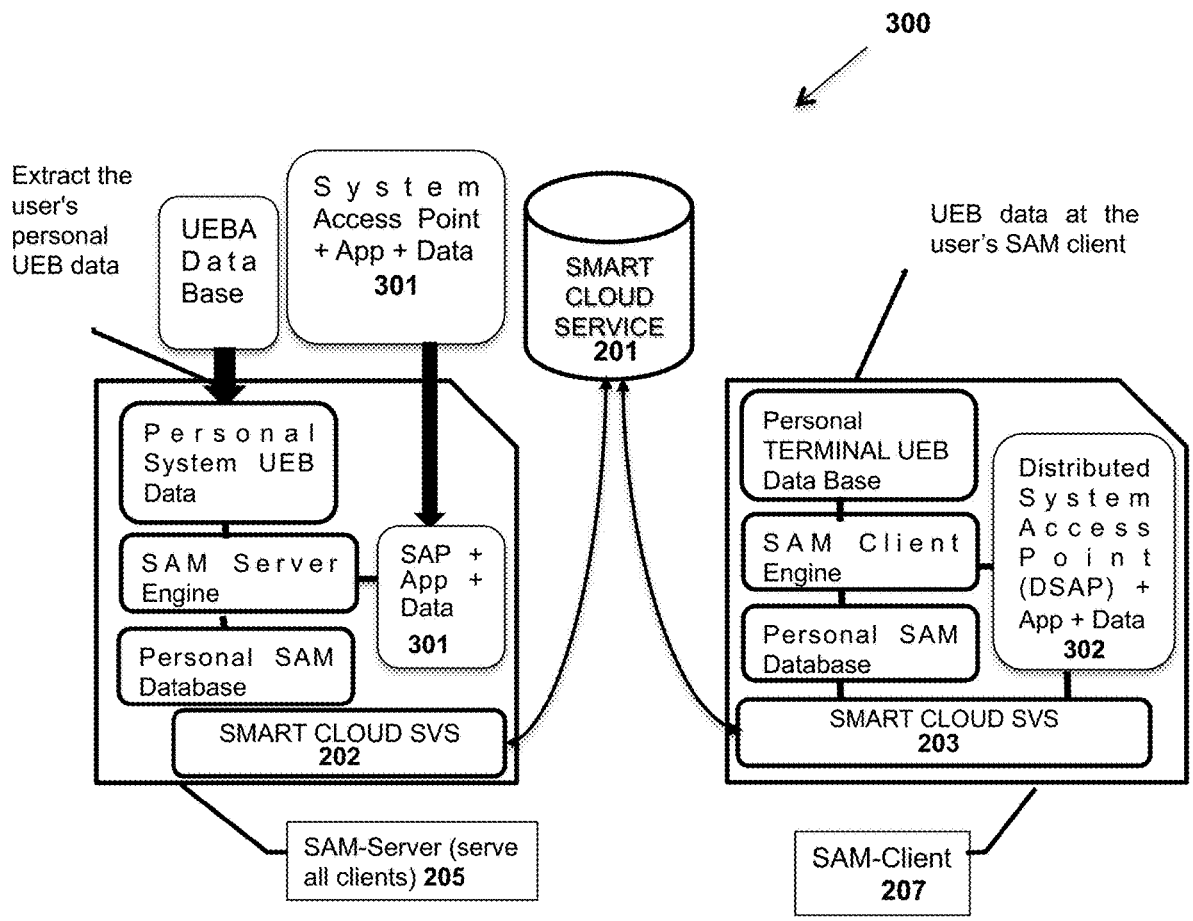
FIG. 3 illustrates the System Access Management (SAM) with smart cloud service with SAP, App and data.

With continued reference to FIG. 2, FIG. 3 shows how to utilize SAP with application and data (SAP+APP+Data) 300 category of the smart-cloud service for secured system access management to enhance security. The SAM server 205 is a more secure access management solution to utilize the smart cloud service 201, 202, 203 to distribute the partial application to wherever is appropriate and to distribute associated data from the protected IP system SAP 301 on the SAM server 205 to the DSAP+APP+Data 302 on the SAM Client 207. The smart cloud service 201, 202, 203 supports the deployment, execution and update of the distributed SAP+APP+Data as part of its service.

An example of using this solution is the online banking application, where the personal banking application along with the user's personal account data is distributed using the smart cloud services onto the user's personal device. The user always has fast and secured access to the online baking application without any access security risk to the entire online banking application system. This solution enables the user to access the desired system application that is actually executing in the SAM Client Engine on the user's device without physically entering the protected IT system, thus further eliminating any possible security risks caused by physically accessing the PITS.

Figure 4:
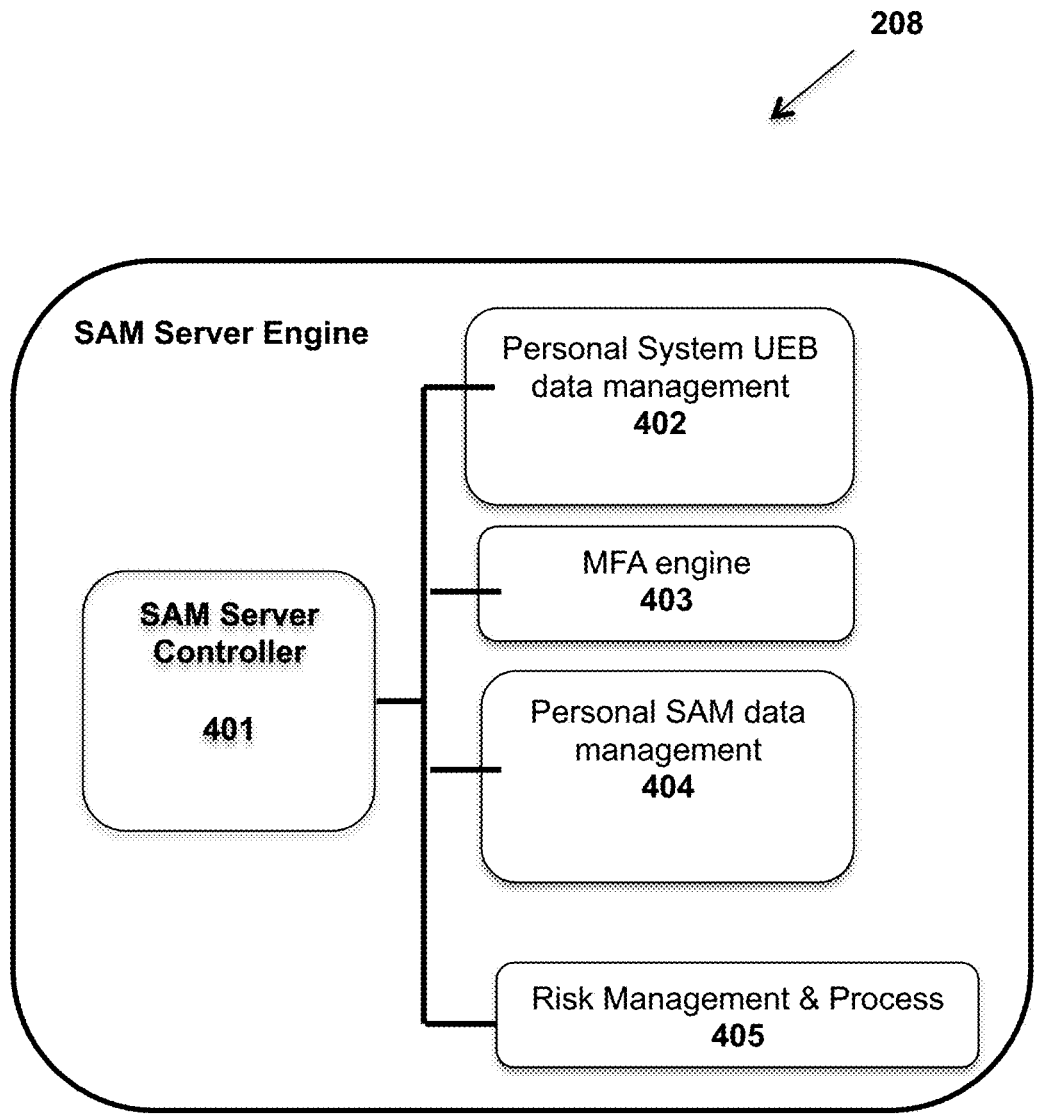
FIG. 4 illustrates the System Access Management (SAM) Server Engine

With continued reference to FIGS. 2 and 3, FIG. 4 shows the SAM server engine 208. The SAM server engine comprises the functional modules SAM server controller 401, personal system UEB data management 402, MFA engine 403, personal SAM data management 404 and risk management & process 405. The SAM server controller is configured to manage the entire operation of the SAM server engine via the functional modules. The personal system UEB data management module is configured to manage the rules for all users' personal system UEB data acquisition and storage through interfacing with personal system UEB data 209. The MFA engine is configured to manage the rules, generate MFA questions and answers and control the multi-factor authentication for accessing the protected IT system through SAP 204, 301. The personal SAM data management module is configured to manage the personal SAM data for all users through interfacing with personal SAM database 211. The risk management and process module is configured to manage the rules and control mechanism such as alert, warning and denying an access and/or a user caused by an accessing security violation. It interfaces with the SAM server controller.

Figure 5:
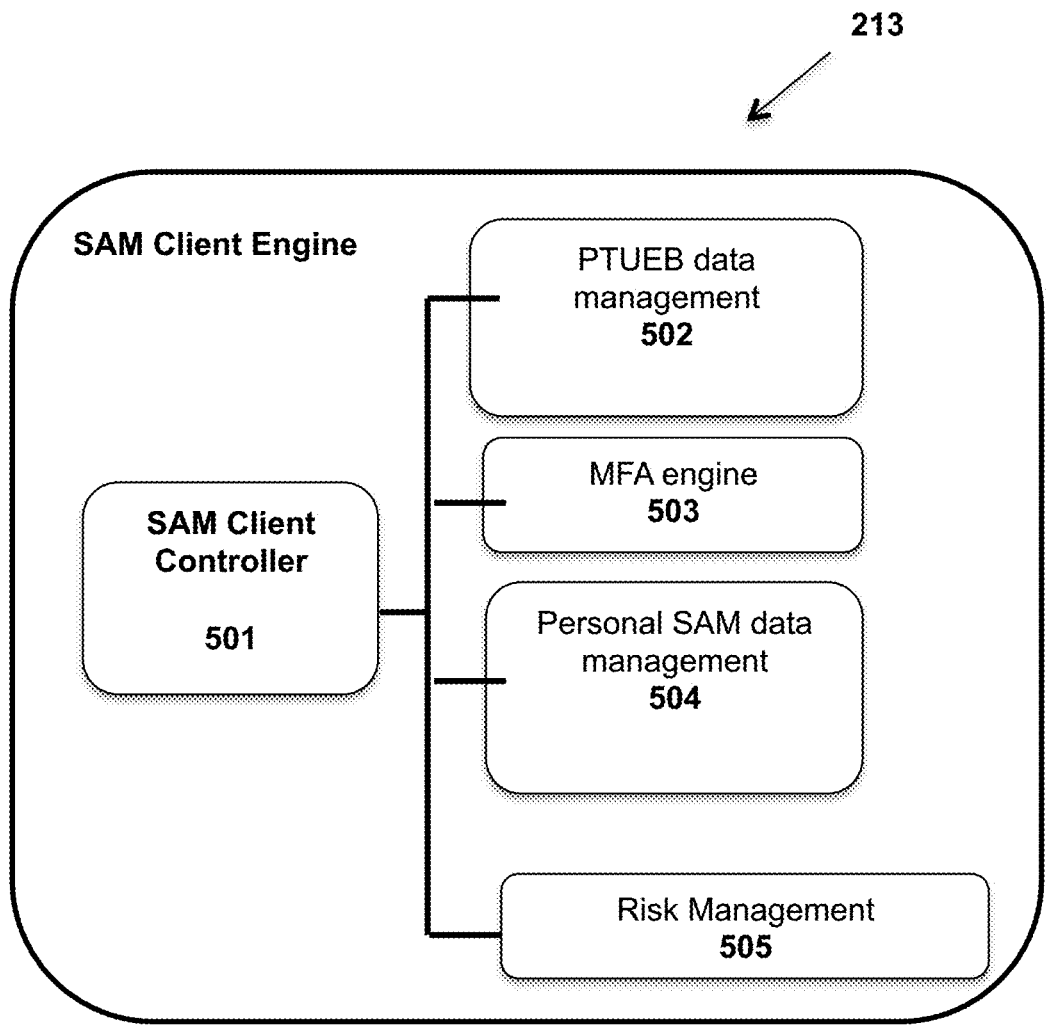
FIG. 5 illustrates the System Access Management (SAM) Client Engine

With continued reference to FIGS. 2 and 3, FIG. 5 shows the SAM client engine 213. The SAM client engine comprises functional modules of the SAM client controller 501, PTUEB data management 502, the MFA engine 503, personal SAM data management 504 and risk management 505. The SAM client controller is configured to manage the entire operation of the SAM client engine through using these functional modules. PTUEB data management is configured to manage the user's PTUEB data acquisition and storage through interfacing with the personal terminal UEB 215. The MFA engine is configured to generate MFA questions and answers and to control the multi-factor authentication for accessing the SAM client server 207 through DSAP 206 or DSAP+APP+DATA 302. The personal SAM data management module is configured to manage the personal SAM data for the user through interfacing with personal SAM data 212. The risk management module is configured to control functions, such as alert, warning and deny an access caused by accessing security violation. It interfaces with the SAM client contoller.

What is claimed is:

1. A smart-cloud service system for enhanced information technology system access security having at least one processor, at least one memory in communication with the processor and at least one network connection to a smart device, said memory tangibly storing instructions that, when executed by the processor are configured to:
   receive as input from a smart device a user request for access to a protected IT system;
   distribute from the smart-cloud parts of a system access point application and middleware environment required for log-in to a system access management (SAM) server and a SAM-client;
   distribute the parts of the system access point application and the middleware environment to the system access management (SAM) server to establish a distributed system access point (DSAP) on the SAM-client; wherein the DSAP is configured to physically isolate user access from the protected IT system;
   extract personal system user behavior data from a user entity behavior analytics database into a personal system UEB database and into a personal system access management (SAM) database on the SAM-server;
   extract personal terminal UEB data from user access to the smart device and to the smart-cloud services system into the personal system UEB database and into the personal SAM database on the SAM-client; and
   generate authentication questions and answers for multi-factor authentication based on data in the personal SAM database on the SAM-client.

2. The smart-cloud service system of claim 1, comprising further processor executable instructions to:
   synchronize the personal SAM databases on the SAM-server and the SAM-client when an incremental change is detected therein.

3. The smart-cloud service system of claim 1, comprising further processor executable instructions to:
   support an initial distribution, deployment and update of a SAM client engine on the SAM-client;
   support an initial distribution, deployment and update of a personal terminal UEB on the SAM-client; and
   support an initial distribution, deployment and update of the personal SAM data on the SAM-client.

4. The smart-cloud service system of claim 1, wherein the system access point (SAP) is a SAP+APP+Data access point, the processor executable instructions are configured to:
   distribute the parts of the SAP+App+Data access point application and the middleware environment to the system access management (SAM) server to establish a distributed SAP+App+Data on the SAM-client.

5. A smart cloud service system, comprising:
   in electronic communication therewith:
      a system access management (SAM) server comprising a system access point (SAP), a SAM server engine and a first plurality of data modules, said SAM server engine in communication with the system access point and the plurality of data modules;
      a user entity behavior analytics (UEBA) module in communication with one of the plurality of data modules SAM server;
      a system access management (SAM) client comprising a distributed system access point (DSAP), said DSAP configured to physically isolate a user access from a protected IT system, and a SAM client engine and a second plurality of data modules, said SAM client engine in communication with the distributed system access point and the second plurality of data modules.

6. The smart cloud service system of claim 5, wherein the system access point is a SAP+App+Data access point and the distributed system access point is a DSAP+App+Data access point.

7. The smart cloud service system of claim 5, wherein the first plurality of data modules comprise a personal system UEB data module and a first personal SAM data module, said personal system UEB data module configured to receive data from the UEBA module.

8. The smart cloud service system of claim 5, wherein the second plurality of data modules comprise a personal terminal UEB data module and a second personal SAM data module, said personal terminal UEB data module configured to receive user behavior analytics data.

9. The smart cloud service system of claim 5, wherein the SAM server engine comprises a SAM server controller that functions to control:

personal system UEB data management;
a multi-factor authentication engine;
personal SAM data management; and
risk management and process.

10. The smart cloud service system of claim 9, wherein the SAM client engine comprises a SAM server controller that functions to control:
personal terminal user entity behavior (PTUEB) data management;
the multi-factor authentication engine;
personal SAM data management; and
risk management.

11. A computer-implemented method for enhancing security during online access of a private IT system; comprising:
receiving an input in the smart cloud service system of claim 5 from a user's smart device requesting access to the private IT system;
distributing therefrom components of the system access point required for log-in to the SAM-server to establish the distributed system access point (DSAP) on the SAM client server;
acquiring data about the user's previous online use and behavior;
generating on the SAM client server at least one authentication question and answer for the user based on the acquired data via a multi-factor authentication engine;
receiving as input the user's answers to the at least one authentication question; and
granting, as output, access to the protected IT system via the system access point if the user's answers agree with the answers generated from data acquired about the user's previous online use and behavior.

12. The computer-implemented method of claim 11, further comprising:
generating at least one additional authentication question and answer if authentication partially or completely fails.

13. The computer-implemented method of claim 11, wherein the distributing step further comprises distributing application and data components to the SAM-server to establish a DSAP+App+Data access point on the SAM client server.

14. The computer-implemented method of claim 11, wherein the step of acquiring data comprises:
extracting via the SAM server engine personal UEB data from a user behavior analytics (UEBA) database into a personal system UEB database and into a personal SAM database both on the SAM server; and
extracting via the SAM client engine personal terminal UEB data from the user's previous access to the smart device and the smart cloud service system into the personal terminal UEB database both on the SAM client.

15. The computer-implemented method of claim 14, further comprising synchronizing the personal SAM databases in the SAM server and in the SAM client when an incremental change occurs.

16. A user-implemented method for securely accessing a protected IT system (PITS) online, comprising:
user-logging in to the system access management (SAM) server and the SAM-client via the parts of the system access point application and middleware environment distributed from the smart-cloud to the smart cloud service system of claim 1;
user-inputting a request on a smart device for access to the protected IT system;
receiving at least one intelligent authentication question from a multi-factor authentication engine based on the user's previous online use and behavior acquired therewith;
user-inputting answers on the smart device to the at least one intelligent authentication questions;
receiving one or more pages from the protected IT system as a display on the smart device if authentication is granted.

17. The method of claim 16, further comprising receiving at least one additional intelligent authentication question after the step of user-inputting the answers.

18. The method of claim 16, wherein the at least one intelligent authentication question is based on the user's personal system access management data acquired from a user behavior analytics (UEBA) database or personal terminal use data acquired from a personal terminal UEB database or a combination thereof.

* * * * *